United States Patent [19]

Haskell

[11] 4,427,227

[45] Jan. 24, 1984

[54] APPARATUS FOR PICKING UP LAMINAR ITEMS

[76] Inventor: John J. Haskell, P.O. Box 125, Kent, Conn. 06757

[21] Appl. No.: 390,559

[22] Filed: Jun. 21, 1982

[51] Int. Cl.$^3$ .................... A01B 1/18

[52] U.S. Cl. .................... 294/50.9

[58] Field of Search .................... 294/50.9, 50.5, 50.6, 294/50.8, 51, 52, 58, 104; 7/1 L; 15/104.8, 257.2, 257.6, 257.7; 56/400.04, 400.11, 400.12

[56] References Cited

U.S. PATENT DOCUMENTS 283,282 8/1883 Rogers .
774,293 11/1904 Tregellas .
884,887 4/1908 Beckwith .
938,759 11/1909 Greene .
1,588,927 6/1926 Willis .................... 294/50.8
2,136,849 11/1938 Hambree .................... 294/50.9
2,772,910 12/1956 Doyle .................... 294/58

*Primary Examiner*—James B. Marbert
*Attorney, Agent, or Firm*—Kenyon & Kenyon

[57] ABSTRACT

An implement particularly intended for picking up asphalt shingles from a randomly strewn pile has a lever pivotally connected on one side of the shaft of a garden fork or similar tool such that movement of the upper end of the lever away from the handle brings the lower end of the lever into contact with the tines of the fork. The length of the lever is preferably about one-half the overall length of the fork, and the distance of the pivot point from the lower end of the lever is preferably about two-fifths of the overall length of the lever.

7 Claims, 7 Drawing Figures

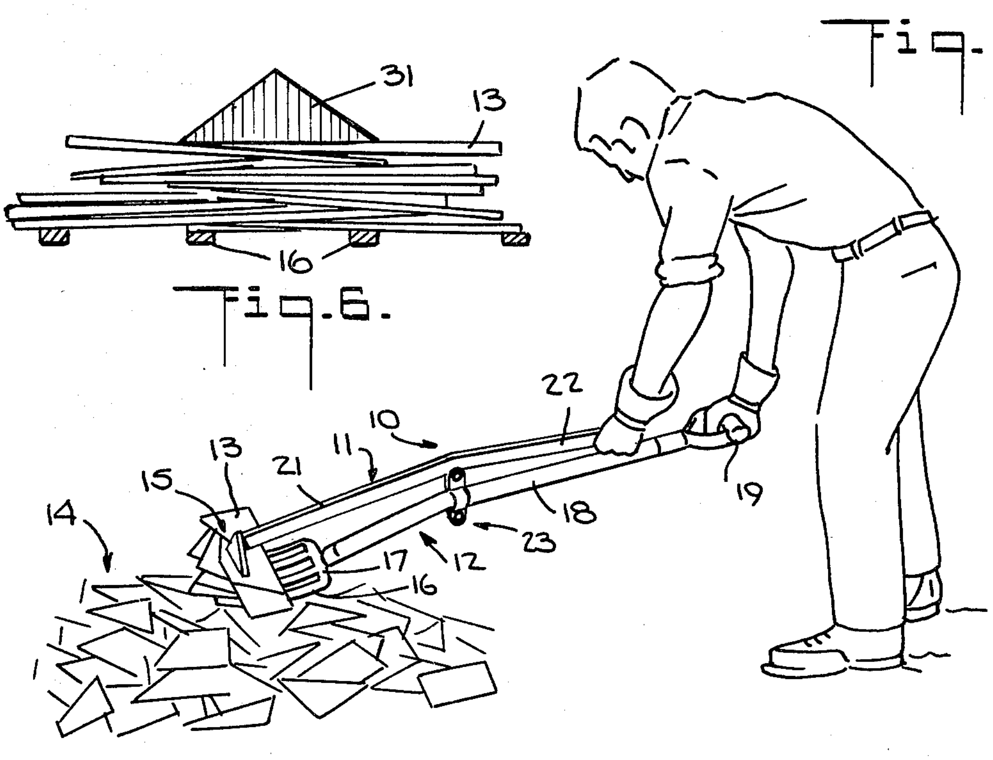
Fig. 6.
Fig. 1.
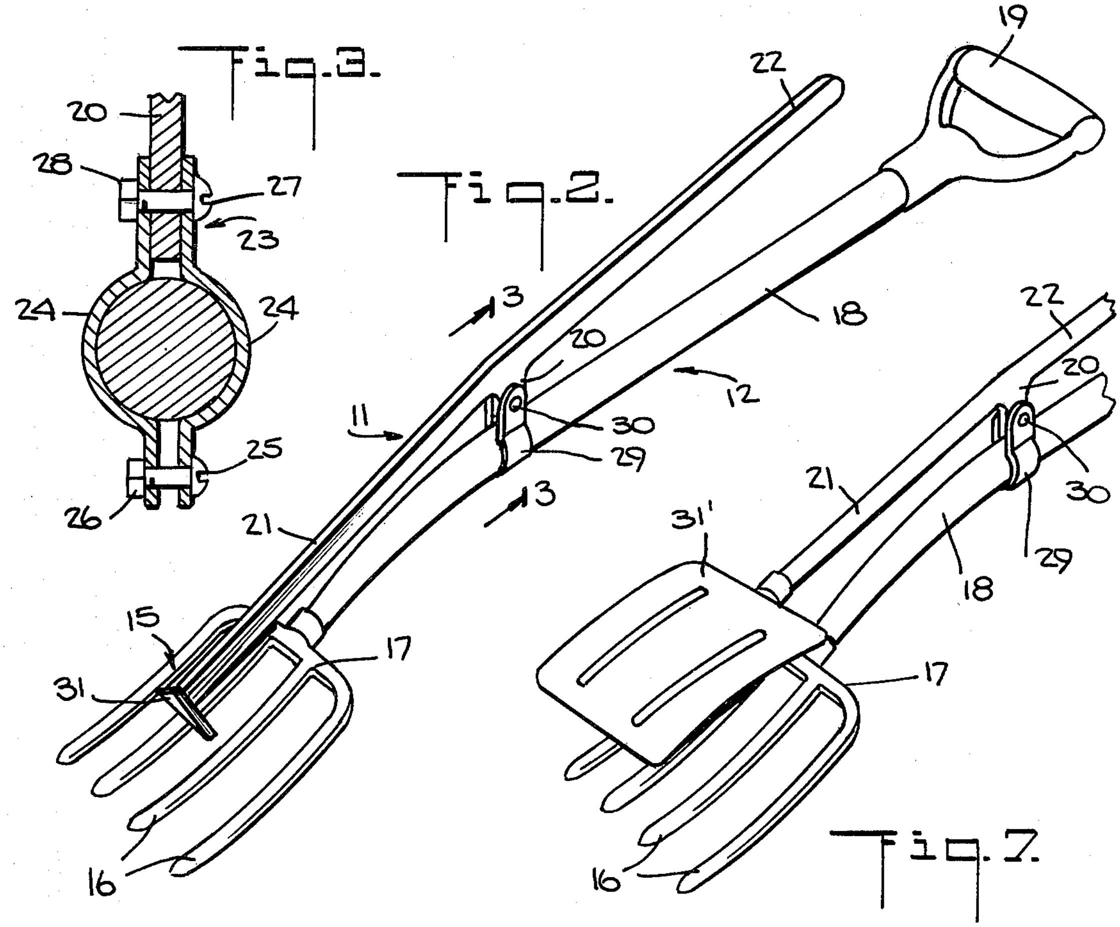
Fig. 3.
Fig. 2.
Fig. 7.

APPARATUS FOR PICKING UP LAMINAR ITEMS

BACKGROUND OF THE INVENTION

1. Field of the Invention

This invention relates to handling implements and particularly to hand tools for picking up laminar items.

2. Description of the Prior Art

A time consuming and unpleasant part of reshingling a roof is picking up the old shingles which usually are ripped off and thrown down in a random pile on the ground as the new shingles are laid. The shingles pile up in an interleaved jumble and cannot be readily disentangled by conventional implements. Consequently, the shingles usually must be picked up laboriously by hand, a task which is hard on the back and potentially injurious because of the rusty nails remaining in the shingles.

Although various grappling tools have been developed for special purposes, to the applicant's knowledge there is no tool that is particularly adapted to picking up shingles or other laminar items from a random pile. For example, U.S. Pat. No. 884,887 of R. H. Beckwith discloses a bean puller having two pivotally connected handles, each with a curved plate attached to a lower end. One plate has a sharpened angled lower edge and the other plate has two spaced rows of teeth parallel to the angled edge of the first plate.

In U.S. Pat. No. 283,282 of A. Rogers a post hole digger is described as combining a conventional straight spade with a shovel pivoted to the handle of the spade. Another similar grappling arrangement is shown in U.S. Pat. No. 774,293 of T. H. Tregellas for a weed puller. Each of these prior art implements includes features that particularly adapt the tool to performing the intended function, but these same features make the tools awkward and difficult to use as implements for picking up shingles or other laminar items.

SUMMARY OF THE INVENTION

It is an object of the present invention to provide a simple and inexpensive hand tool specifically adapted to be easily inserted in a random pile of laminar items and then to simultaneously extract and to lift a portion of the items from the pile for transfer to another location.

A further object of the invention is to provide a hand tool for picking up shingles in which application of a single moment couple produces both gripping and lifting forces.

Another object of the invention is to provide a pivoted lever attachment for converting a conventional garden fork to a tool for picking up shingles.

These and other objects are achieved by an apparatus which includes a forked implement having an elongated shaft, a plurality of spaced tines extending from a transverse bar attached to one end of the shaft, and a hand grip at the other end of the shaft; a lever shorter than the shaft and having a pivot location intermediate its ends; and means for pivotally connecting the lever in spaced relation to the shaft at the pivot location such that one end of the lever moves toward the tines when the other end of the lever is moved away from the other end of the shaft.

The pivot location is desirably between one-third and one-half of the length of the lever from the one end which contacts the tines of the fork, and preferably approximately 40 percent of the distance from the one end. This provides a reasonable mechanical advantage for strong clamping action while allowing a good range of movement of the lever.

These and other features and advantages of the invention will be readily apparent from the following detailed description, in conjunction with the accompanying drawings.

BRIEF DESCRIPTION OF THE DRAWINGS

FIG. 1 is a perspective view of an apparatus according to the invention, being used to pick up shingles.

FIG. 2 is a perspective enlarged view of the pickup apparatus of FIG. 1.

FIG. 3 is a partial cross section of the apparatus, taken in the direction of arrows 3—3 in FIG. 2.

FIG. 6 is an end view taken in the direction of arrows 6—6 in FIG. 5.

FIG. 7 is a partial view, in perspective, of an alternative embodiment of the apparatus of FIGS. 1–6.

DETAILED DESCRIPTION OF THE PREFERRED EMBODIMENT

Figures 4, 5:
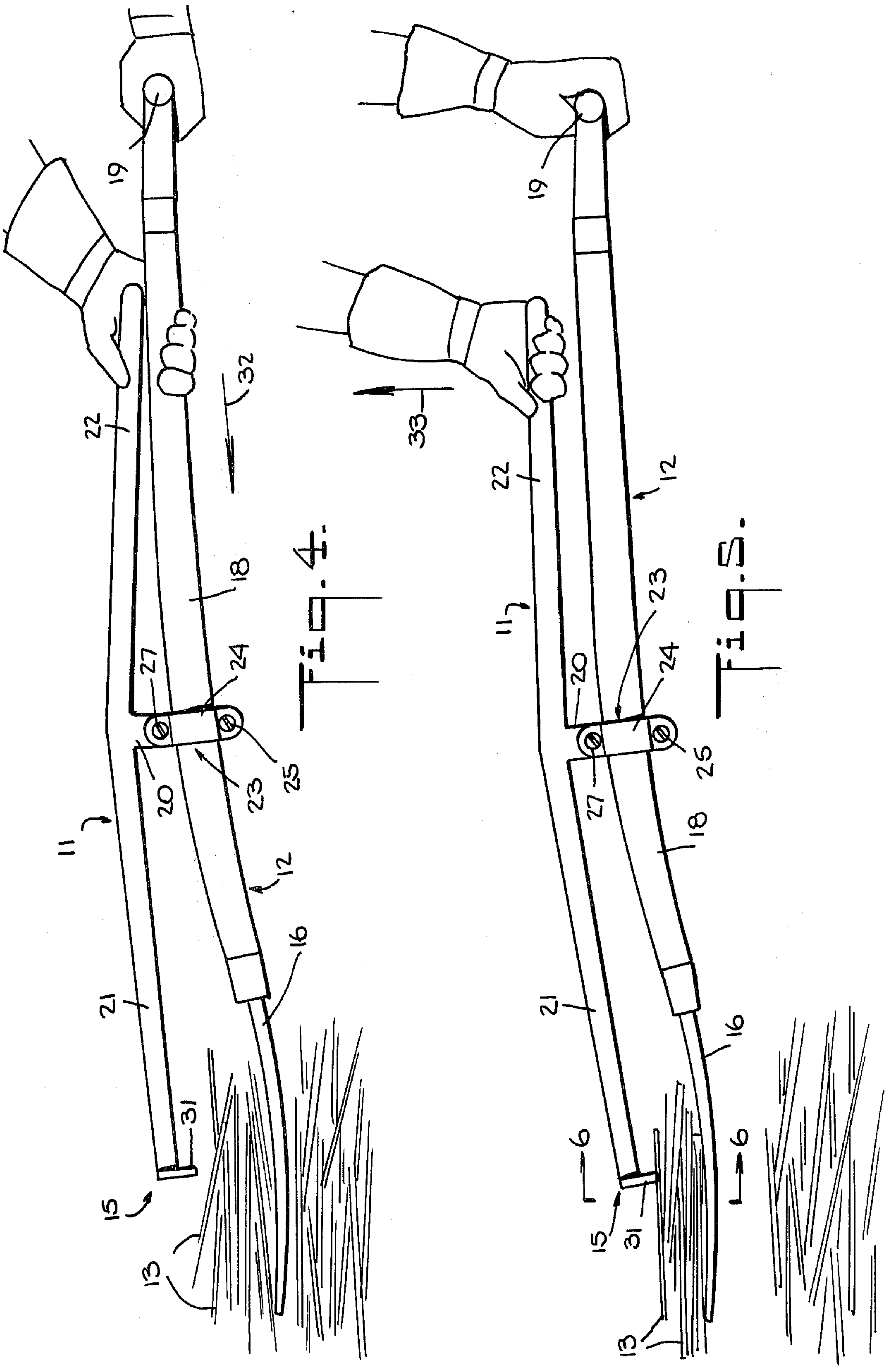
FIG. 4 is a side view of the apparatus being inserted in a pile of shingles or other laminar items.
FIG. 5 is a side view of the apparatus lifting a group of shingles from the pile of FIG. 4.

With reference to FIG. 1, an apparatus 10 which includes a lever 11 attached to a forked implement 12 is uniquely adapted to pick up laminar items 13, such as shingles, from a randomly strewn pile 14 by clamping the shingles with one end 15 of the lever against tines 16 of the forked implement, so that the shingles can be pulled out of the pile and lifted.

As shown more clearly in FIG. 2, the forked implement 12 preferably is a conventional garden fork in which slightly upwardly angled tines 16 extend integrally from a transverse bar 17 attached to one end of an elongated shaft 18 that has a transverse handle 19 at its other end. The lever 11 is formed from a single piece of metal plate, such as steel or aluminum. Any other material, suitably strong for the intended purpose, can be used, however, such as wood, fiber reinforced plastic, and so forth. The lever has a transversely extending pivot tab 20 which divides the lever into a lower clamping arm 21 and an upper grasping arm 22.

With particular reference to FIG. 3, the lever is pivotally connected to the handle of the forked implement by means such as a clamp 23, which is assembled from two omega-shaped bars 24 secured by lower bolt 25 and nut 26 and by upper bolt 27 and nut 28. The upper bolt also extends through a hole in tab 20 to serve as a pivot pin for lever 11.

The clamp can also be formed from a single wrap-around bar 29 having only one fastener 30, as shown in FIG. 2. Fastener 30 may be a bolt and nut, a rivet, or other conventional means for both closing the clamp around the shaft of the fork and serving as a pivot pin for the lever. This arrangement is less expensive than the two-bar clamp, but it also is less adjustable and makes it more difficult to assemble and dismantle the apparatus. Ease of assembly and disassembly is desirable since the fork can then be used by itself for gardening and so forth.

Although the outer end 15 of the clamping arm 21 of the lever may be left plain, better clamping effect is obtained by attaching a cross member 31 to the end of the lever, either permanently by welding or brazing, or removably by a socket and cross pin or other suitable means. Cross member 31, as shown most clearly in FIG.

6, is a flat triangular bar, but it may be rectangular or any other suitable shape for clamping shingles or other laminar items against the tines of the fork. The cross member has an edge 32 which is long enough to contact the opposed faces of at least two tines of the forked implement near their midpoints when the other end of the lever is moved away from the handle 19, so as to distribute the clamping force over a broader area. This type of cross member is particularly adapted for clamping shingles, which are relatively stiff and larger in area than the fork region of the implement.

FIG. 7 shows an alternative embodiment of a cross member 31′ that is particularly adapted for picking up leaves or other relatively small and flexible laminar items from a pile. In this embodiment, the cross member 31′ is a thin stiff substantially rectangular sheet or plate of metal or plastic attached to the outer end of lever 11 at the midpoint of one edge. The attachment may be by any suitable means, either releasable or permanent. If releasable attachment means are used, such as a socket with a setscrew, the apparatus can be provided as a set, with alternative types of cross member 31 and 31′, so that the apparatus can be used efficiently to pick up either shingles or leaves. In this regard, a larger forked implement, such as a hay fork, may be used with the leaf picking up attachment 31. Furthermore, the cross membr 31′ may be perforated or made of wire mesh with a stiff border, for minimum weight.

The manner of using the apparatus of the invention for picking up shingles is best understood from FIGS. 4 and 5. The apparatus is assembled by connecting lever 11 to the shaft of a forked implement such as garden fork 12 by means of clamp 23, so that cross member 31 is positioned approximately at the midpoint of tines 16. The handle 19 of the fork is then grasped by one hand and the shaft by the other hand, with the upper end of the lever held against the shaft by the thumb of the other hand, as shown in FIG. 4. This provides a maximum opening between the tines and cross member 31, to permit easy insertion of the tines into a pile of shingles 13 by moving the fork in the direction of arrow 32, while holding it approximately horizontal.

After the fork tines are inserted into the pile of shingles, the grip of the one hand on handle 19 is shifted so as to resist upward force exerted by the handle. The other hand is shifted to grasp lever arm 22 and to lift upward, in the direction of arrow 33 in FIG. 5. The upward lifting force causes the lever to pivot around pin 27, thereby pressing cross member 31 against the portion of the shingles between the end 15 of the lever and the tines of the fork. The resistance of the one hand against handle 19 produces a force couple tending to rotate the apparatus clockwise around handle 19. Thus, lifting up on lever arm 22 accomplishes the dual functions of gripping the shingles between the end of lever arm 21 and the fork tines and of lifting the shingles off the pile.

It will be clearly apparent from FIG. 5 that both the lifting force and the gripping force are automatically determined by the weight of items picked up. The heavier the shingles, the more lifting force is required, and this results in more gripping force to prevent the shingles from slipping off the tines.

It will be further apparent from FIG. 5 that the lifting force required for a given weight of shingles and the relation between the lifting force and the resulting gripping force on the shingles are governed by the location of the pivot tab on lever 11 and the positioning of the other hand on lever arm 22. Stated more precisely, the ratio between lifting force and gripping force is equal to the ratio of the length of lever arm 21 to the distance between pivot tab 20 and the point of application of the lifting force; whereas the ratio of lifting force to the weight of items lifted is equal approximately to the ratio of the length of the forked implement to the distance between handle 19 and the point of application of the lifting force.

For any given lever the total length is fixed, but the gripping position, of course, can be varied. In the illustrated embodiments, the pivot location on the lever is also fixed. If desired, however, it would be possible to have a plurality of pivot locations by providing a plurality of pivot holes spaced along the lever. It had been found that optimum effectiveness results when the distance of the pivot location to the end 15 of the lever is between about one-third and about one-half the total length of the lever, and preferably approximately two-fifths of the total length of the lever. The length of the lever itself should be between about one-half and about three-quarters of the length of the shaft of the forked implement, and preferably approximately two-thirds of the shaft length and approximately one-half of the overall length of the forked implement.

A very effective working example of the invention has the following approximate dimensions:

Overall length of forked implement—42 inches
Shaft length of forked implement—30 inches
Overall length of lever—20 inches
Length of lever arm 21—8 inches
Length of lever arm 22—12 inches Although variation of an inch or so from the above dimensions does not seriously degrade the operability of the assembly, it has been found that an apparatus having these dimensions is very easy and handy to use. In particular, a lifting force of roughly twice the weight of the shingles is required to raise the shingles, and a gripping force roughly equal to the lifting force is applied to the shingles when lever arm 22 is grasped near its end, as shown in FIG. 5.

Although specific embodiments have been shown and described, these are by way of illustration only. They are not intended to limit the scope of the invention, which also includes all structures equivalent to those described and claimed.

What is claimed is:

1. Apparatus for picking up laminar items from a randomly strewn pile of such items, the apparatus including a forked implement having an elongated shaft, a plurality of spaced times extending generally in the longitudinal direction of the shaft, the tines being almost straight with no abrupt change in curvature, and a transverse hand grip at the other end of the shaft, wherein the improvement comprises:

a lever shorter than said shaft and having a pivot location intermediate its ends and means for pivotally connecting the lever in spaced relation to the shaft at said pivot location such that one end of the lever moves toward the tines when the other end of the lever is moved away from the other end of the shaft, said one end of the lever including a cross member extending transversely to the tines of the forked implement for clamping laminar items against said tines, the cross member comprising a flat bar having an edge extending perpendicularly to the tines and adapted to contact the opposed faces of at least two tines when the other end of the lever is moved away from the other end of the shaft.

2. Apparatus according to claim 1 wherein the distance from the pivot location to the one end of the lever is between about one-third and about one-half of the total length of the lever.

3. Apparatus according to claim 1 wherein the distance from the pivot location to the one end of the lever is approximately two-fifths of the total length of the lever.

4. Apparatus according to claim 1 wherein the length of the lever from the pivot location to the other end is less than the length of the shaft of the forked implement from the pivot location to the hand grip.

5. Apparatus according to claim 1 wherein the total length of the lever is between about one-half and about three-quarters of the length of the shaft of the forked implement.

6. Apparatus according to claim 1 wherein the total length of the lever is approximately two-thirds of the length of the shaft of the forked implement and is approximately one-half the total length of the forked implement.

7. Apparatus according to claim 1 wherein said means for pivotally connecting the lever in spaced relation to the shaft comprises an arm integral with the lever and extending transversely thereto at said pivot location, a clamp member encircling the shaft of the forked implement, and a pin joining the outer end of the arm to the clamp member, said pin serving simultaneously as a pivot for the lever and to compress the clamp member around the shaft.

* * * * *